United States Patent [19]

Tanaka et al.

[11] Patent Number: 5,680,283

[45] Date of Patent: Oct. 21, 1997

[54] MAGNETIC HEAD AND MAGNETIC DISK DRIVE

[75] Inventors: Tsutomu Tanaka, Yokohama; Tomoko Taguchi; Yoichiro Tanaka, both of Kawasaki, all of Japan

[73] Assignee: Kabushiki Kaisha Toshiba, Kawasaki, Japan

[21] Appl. No.: 523,966

[22] Filed: Sep. 6, 1995

[30] Foreign Application Priority Data

Sep. 30, 1994 [JP] Japan .................... 6-261276

[51] Int. Cl.$^6$ .................... G11B 5/127; G11B 5/187
[52] U.S. Cl. .................... 360/125; 360/122; 360/110
[58] Field of Search .................... 360/110, 122, 360/125, 126, 127, 119, 120

[56] References Cited

U.S. PATENT DOCUMENTS

| | | | |
|---|---|---|---|
| 4,982,301 | 1/1991 | Endo | 360/125 |
| 5,075,956 | 12/1991 | Das | 360/122 X |
| 5,181,149 | 1/1993 | Katsumata et al. | 360/119 |
| 5,486,967 | 1/1996 | Tanaka et al. | 360/113 |
| 5,550,796 | 8/1996 | Ishii | 369/13 |

OTHER PUBLICATIONS

IEEE Trans. Magn., vol. MAG-27, pp. 4921-4925, Nov. 1991.

Journal of the Magnetic Society of Japan vol. 15, Supplement, No.SZ, pp. 185-190, 1991.

*Primary Examiner*—Robert S. Tupper
*Assistant Examiner*—William J. Klimowicz
*Attorney, Agent, or Firm*—Oblon, Spivak, McClelland, Maier & Neustadt, P.C.

[57] ABSTRACT

A ratio tW/pL of a track width tW to a width pL of an end face, in a traveling direction, of a main pole which performs recording or reproduction on or from the magnetic recording layer of a medium, and a saturation magnetic flux density Bs. (T: tesla) of a magnetic material constituting the main pole satisfy:

$$(A_1 \times Bs + B_1)^2 + C_1 \leq tW/pL \leq (A_2 \times Bs + B_2)^2 + C_2$$

for $A_1 = 4.3 \times \delta + 0.4$, $B_1 = -16.2 \times \delta - 0.3$, $C_1 = 2.2 \times \delta + 0.3$, $A_2 = 378 \times \delta^2 - 66 \times \delta + 4.2$, $B_2 = 264 \times \delta^2 - 43 \times \delta + 2.1$, and $C_2 = 9 \times \delta - 2.5$ where $\delta$ (µm) is a distance from the end face of the main pole to the soft magnetic under layer.

16 Claims, 10 Drawing Sheets

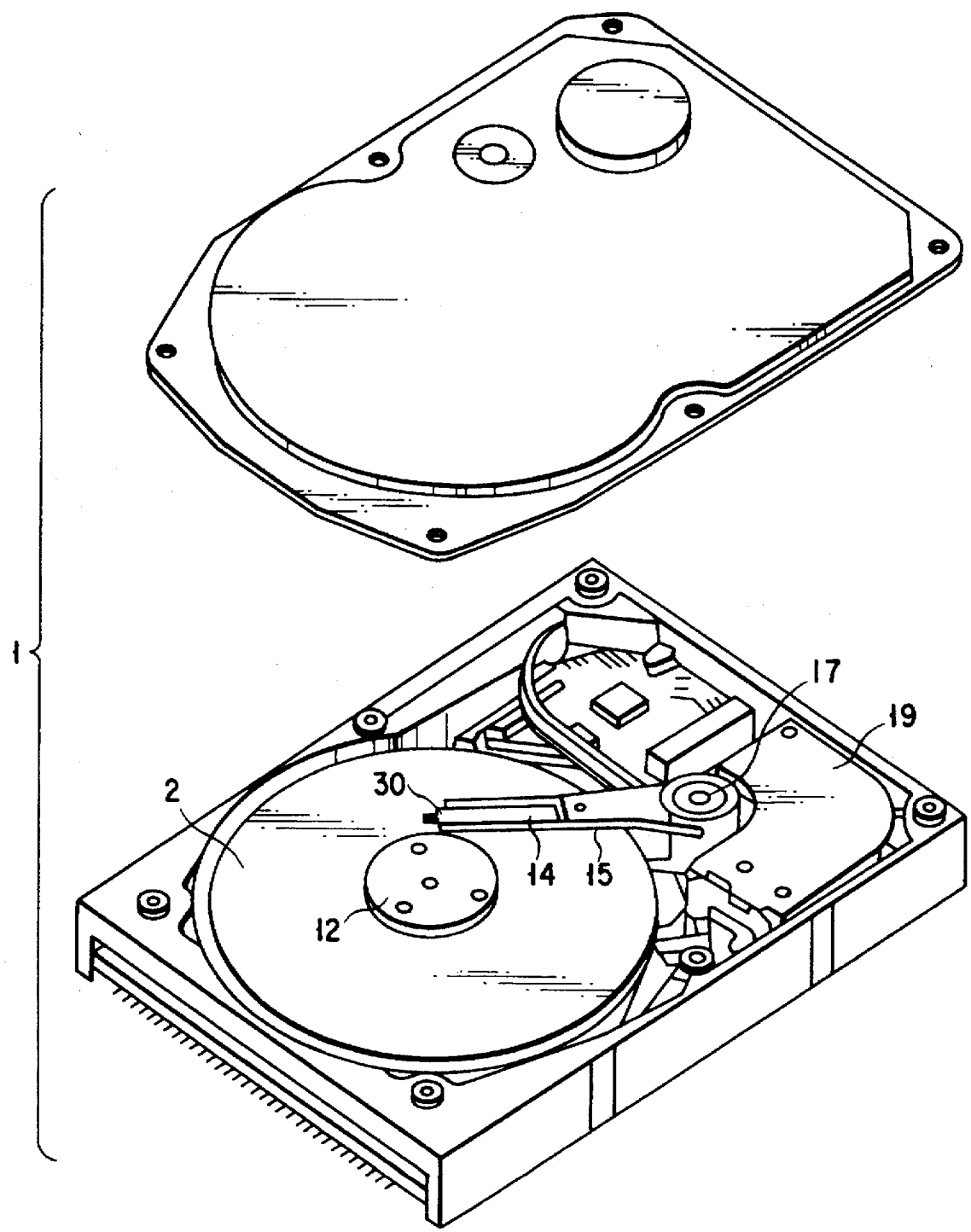
F I G. 1

MAGNETIC HEAD AND MAGNETIC DISK DRIVE

BACKGROUND OF THE INVENTION

1. Field of the Invention

The present invention relates to a magnetic head used in a magnetic disk drive and, more particularly, to a magnetic head and a magnetic disk drive for perpendicular magnetic recording, which have structures and characteristics optimum for a higher track density and a smaller track pitch.

2. Description of the Related Art

Conventionally, in the field of computers, magnetic disk drives are widely used as large-capacity external storages which allow random access. As these magnetic disk drives are very popular, demands increasingly arise for magnetic disk drives having a larger memory capacity and a higher recording density.

In a magnetic disk drive, usually, a plurality of magnetic disks each obtained by forming a magnetic layer on a non-magnetic substrate are stacked and mounted on one rotating shaft. Magnetic heads for performing recording and reproduction on and from these magnetic disks are mounted to arms. These arms are driven by actuators, thereby positioning the magnetic heads.

In the magnetic disk drive having this structure, each magnetic head is arranged so as to access a desired portion on the disk surface which is rotated at a high speed during recording and reproduction of information, such that it will not be brought into direct contact with the disk surface but slightly flies above the disk surface. A signal is recorded on or reproduced from concentric tracks of the disk surface by the magnetic head.

In the magnetic disk drive, in order to satisfy the demand for the larger memory capacity, attempts have been made to increase the linear recording density of the disk, i.e., the recording density in the circumferential direction or to increase the track density, i.e., the recording density in the radial direction. Furthermore, in order to increase the recording density, studies of extremely low flying height recording or contact recording have extensively been made in recent years, with which recording/reproduction is performed by causing the magnetic head to fly extremely slightly above the magnetic disk or by bringing the magnetic head into almost contact with the magnetic disk.

As a method of increasing the linear recording density, perpendicular magnetic recording was proposed in 1975. According to the perpendicular magnetic recording, since demagnetization in a magnetization transition portion can be made very small as compared to conventional longitudinal magnetic recording having anisotropy in a longitudinal direction, the magnetization transition width can be decreased. Thus, high-density recording is enabled. It is known that in this perpendicular magnetic recording, when a magnetic head for perpendicular magnetic recording which uses strip-type soft magnetic thin films is used, a recording field in a more perpendicular direction can be obtained, which is effective for obtaining a higher density. A magnetic disk having a perpendicular double layered medium obtained by providing a soft magnetic underlayer under a magnetic recording layer having a perpendicular magnetic anisotropy, is also proposed to increase the recording and reproducing efficiency in the perpendicular magnetic recording scheme, thereby forming a sharper magnetization transition. When this magnetic disk is employed, demagnetization at the distal end of the magnetic head can be decreased due to the magnetic interaction of the magnetic head and the underlayer, so that a larger magnetic field can be obtained in recording. In reproduction, similarly, demagnetization at the distal end of the magnetic head can be decreased, so that the effective magnetic permeability can be increased. As a result, the magnetic flux emanating from the medium can be efficiently converged on the magnetic head, thereby obtaining a more intense signal.

In order to obtain a magnetic flux from a magnetization transition portion of a medium on which perpendicular recording has been performed efficiently, it is important that the magnetic head is moved close to the surface of the medium. For this reason, a conventional magnetic head for perpendicular recording is used to be brought into contact with the surface of a medium. However, the conventional magnetic head has problems in durability and wear resistance.

With the perpendicular magnetic recording scheme, magnetization is set upward or downward in the perpendicular direction with respect to the surface of the medium. Even if a 1-bit length is small, magnetization which is stable in terms of energy can be left in the recording layer of the medium. Therefore, the perpendicular magnetic recording scheme has been regarded as a method which is effective for realizing a higher density in principle. With the state-of-the-art perpendicular magnetic recording medium, however, as the recording magnetic field and inclination of the magnetic field are insufficient, satisfactory recording cannot be made on the medium. For this reason, a magnetic head having a higher recording ability than the conventional magnetic head has been demanded.

SUMMARY OF THE INVENTION

It is an object of the present invention to provide a magnetic head and a magnetic recording apparatus having a high recording ability in the perpendicular magnetic recording scheme which is suitable for a higher density.

It is another object of the present invention to provide a magnetic head in a magnetic disk drive employing the perpendicular magnetic recording scheme, which has an optimum size for its recording ability.

It is still another object of the present invention to provide the structure of a magnetic head which has a sufficiently high perpendicular recording ability without being brought into complete contact with the surface of a medium while maintaining a wear resistance.

According to the present invention, there is provided a magnetic head for recording or reproducing information on or from a magnetic recording medium including a magnetic recording layer for information recording which has a magnetic anisotropy in a direction perpendicular to a surface of the recording medium, a soft magnetic underlayer provided under the magnetic recording layer and having soft magnetic properties, and a non-magnetic substrate, wherein a ratio tW/pL of a track width tW to a width pL of an end face, in a traveling direction, of a main pole which performs recording or reproduction on or from the magnetic recording layer, and a saturation magnetic flux density Bs (T: tesla) of a magnetic material constituting the main pole satisfy:

$$(A_1 \times Bs + B_1)^2 + C_1 \leq tW/pL \leq (A_1 \times Bs + B_2)^2 + C_2$$

for $A_1 = 4.3 \times \delta + 0.4$ $B_1 = -16.2 \times \delta - 0.3$ $C_1 = 2.2 \times \delta + 0.3$ $A_2 = 378 \times \delta^2 - 66 \times \delta + 4.2$ $B_2 = 264 \times \delta^2 - 43 \times \delta + 2.1$ $C_2 = 9 \times \delta - 2.5$ where $\delta$ (μm) is a distance from the end face of the main pole to the soft magnetic underlayer.

According to the present invention, there is also provided a magnetic head comprising a head core having a main pole for perpendicular magnetic recording, and a non-magnetic slider integrally formed with the head core and having a rail for generating a floating force on a surface thereof opposing a magnetic disk, wherein the main pole is attached to a surface which is perpendicular to a slide Surface of the slider rail.

According to the present invention, there is also provided a magnetic disk drive having a magnetic recording medium constituted by a magnetic recording layer having a magnetic anisotropy in a direction perpendicular to a surface of the recording medium, a soft magnetic underlayer provided under the magnetic recording layer and having soft magnetic properties, and a non-magnetic substrate, and a magnetic head which records information on the magnetic recording medium, the magnetic disk drive recording a signal with a skew angle on at least some tracks, wherein the magnetic head has a main pole of a size satisfying:

$$pL < tP < tW \cos\theta / \sin\theta$$

where pL is a width of an end face of the main pole in a traveling direction, tW is a track width of the end face of the main pole, tP is a track pitch, and $\theta$ is a skew angle of a trailing edge of the main pole.

When the relationship between the ratio tW/pL of the track width tW to the width pL of the end face, in the traveling direction, of the main pole which performs recording or reproduction on or from the information recording magnetic film, and the saturation magnetic flux density Bs of the magnetic material constituting the main pole is determined, perpendicular recording having a high recording ability can be obtained at maximum, thereby remarkably increasing the recording ability.

When this magnetic head is used in a magnetic disk drive, if the relationship between the main pole thickness and the track pitch Tp is determined, even if the track density becomes very high, the main pole will not bulge into the signal recording region of an adjacent track. Thus, the magnetic head will not erroneously erase information on the adjacent track or overwrite it on the adjacent track.

When the head core having the main pole is attached to a surface of the magnetic head which is perpendicular to the slide surface, sufficient recording and reproduction can be performed on and from a medium having a perpendicular magnetic anisotropy. In particular, when the magnetic head according to the present invention is employed for a medium having a recording layer and a soft magnetic underlayer, a high recording/reproducing effect can be obtained.

Since the head core is not buried in the slider, the slider and the head core can be separately fabricated as independent components and can be assembled together afterwards. Thus, the magnetic head can be easily manufactured at a high precision.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention, in which:

FIG. 1 is an exploded perspective view showing a magnetic disk drive;

DETAILED DESCRIPTION OF THE PREFERRED EMBODIMENTS

Figure 2:
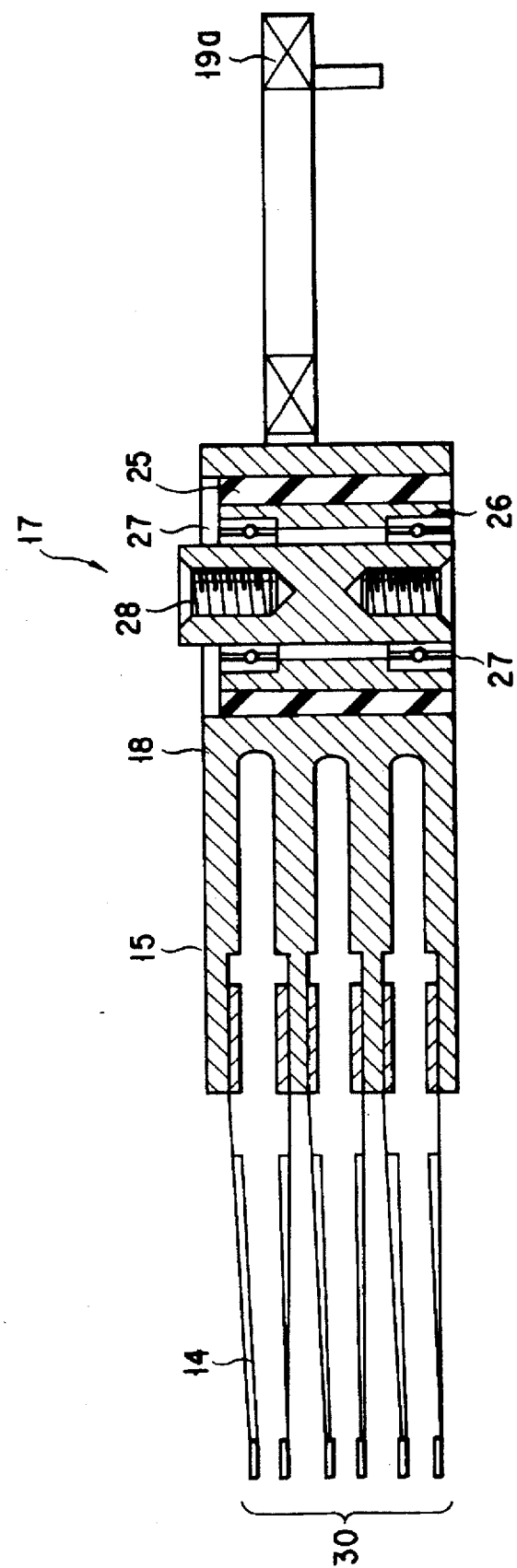
FIG. 2 is a longitudinal sectional view showing the support mechanism of magnetic heads.

Several preferred embodiments of the present invention will be described with reference to the accompanying drawings.

FIG. 1 shows the schematic arrangement of a magnetic disk drive 1 using a rotary actuator. A disk or medium 2 is mounted on a spindle 12 and rotated at a predetermined speed. A magnetic head 30 is mounted on and supported by the distal end of a thin-plate suspension 14 and brought into contact with the recording/reproduction surface of the disk 2. An electromagnetic converting portion (not shown) for recording/reproducing information is mounted on the magnetic head 30. The suspension 14 is coupled to one end of an arm 15. The arm 15 has a bobbin portion for holding a driving coil 19a. A voice coil motor 19 as a kind of linear motor is provided to the other end of the arm 15. The voice coil motor 19 has the driving coil 19a wound on the bobbin portion of the arm 15, and a magnetic circuit comprising a permanent magnet and a counter yoke. The magnetic circuit opposes the driving coil 19a to sandwich it. The arm 15 is swingably supported by ball bearings (not shown) provided at the upper and lower portions of a pivot portion 17. The ball bearings provided around the pivot portion 17 are held by a carriage portion 18.

A magnetic head support mechanism is controlled by a positioning servo driving system. The positioning servo driving system comprises a feedback control circuit having a head position detection sensor (not shown), a power supply (not shown), and a controller (not shown). When a signal is supplied from the controller to the respective power supplies based on the detection result of the position of the magnetic head 30, the driving coil 19a of the voice coil motor 19 and the piezoelectric element (not shown) of the head portion are driven.

As shown in FIG. 2, the rotary actuator has six suspensions 14, and the magnetic heads 30 are provided at the distal ends of the respective suspensions 14. Simultaneous recording and reproduction on and from the both surfaces of each of three media can be performed by using the total of six (=3×2 sets) magnetic heads 30. The suspensions 14 are cantilevered by the four head arm portions 15, and the head arm portions 15 are cantilevered by the carriage portion 18. Reference numeral 19a denotes the driving coil. The driving coil 19a constitutes the voice coil motor 19 together with the magnetic circuit (not shown).

The pivot portion 17 has a stationary shaft 28, a pair of upper and lower ball bearings 27 fitted on the outer surface of the stationary shaft 28, and a holding cylinder 26. The holding cylinder 26 holds the pair of upper and lower ball bearings 27 around the stationary shaft 28 and holds the entire portion of the pivot portion 17 in the carriage portion 18 through a viscoelastic member 25. The stationary shaft 28 is fixed to the frame of the main body (not shown) with a plurality of screws. The driving coil 19a is fixed to the carriage portion 18 with an adhesive or the like.

The magnetic head will be described with reference to FIG. 3.

Figure 3:
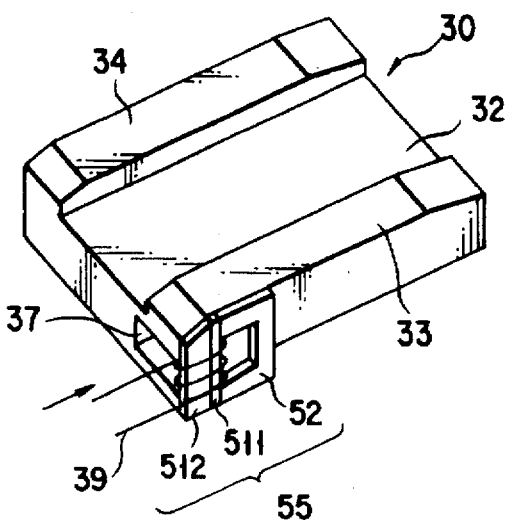
FIG. 3 is a perspective view showing a magnetic head according to the first embodiment of the present invention.
Figure 4:
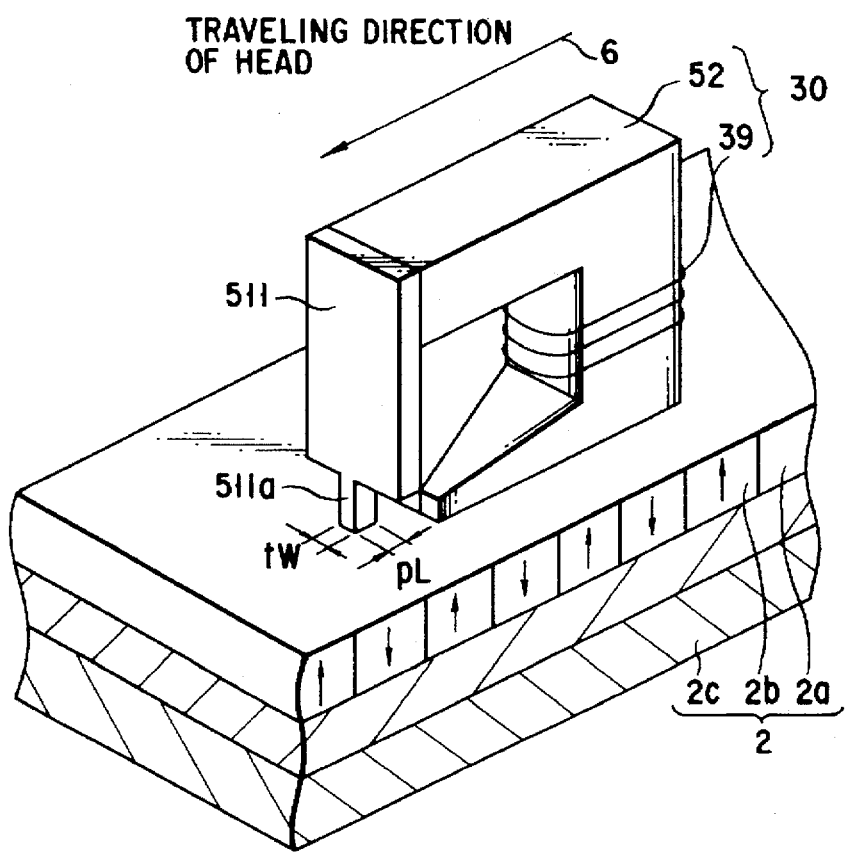
FIG. 4 is a partial enlarged perspective view of the magnetic head and a magnetic disk.

As shown in FIG. 3, each magnetic head 30 has a slider 32, a pair of rails 33 and 34, and a head core 55. The head core 55 of the magnetic head 30 is attached perpendicular to a slide surface of the slider 32 intersecting the slide surface, i.e., on the side surface of the rail 33. The rails 33 and 34 are provided to the both sides of the slider 32. A slit 37 is formed in one end portion of the rail 33, and the head core 55 is provided in the vicinity of the slit 37.

The head core 55 has a main pole 511, a ferrite portion 512, and a return path portion 52. The main pole 511 is made of a soft magnetic material, e.g., ferrite, having soft magnetic properties, and a coil 39 is wound on the main pole 511. The return path portion 52 is provided to concentrate the magnetic flux on the distal end of the main pole 511. More specifically, the return path portion 52 opposes the main pole 511 in order to increase the recording and reproducing efficiency.

The head core of a conventional magnetic head is buried in a slider rail. In contrast to this, in the magnetic head 30 of this embodiment, since the head core 55 is attached outside the slider, the slit 37 does not appear on the slide surface of the rail 33. The material of the slider 32 is, e.g., an oxide-based ceramic, and is selected by considering the hardness, the thermal expansion coefficient, the density, the denseness, and slidability with the medium. Generally, a titanate-based ceramic, e.g., calcium titanate, barium titanate, strontium titanate, or magnesium titanate is used for making the slider 32.

In this case, the height of the head core 55 is substantially the same as that of the slider rail 33. The end face of the main pole 511 can have the same level as or slightly project from the slide surface of the slider rail 33.

The head core 55 is made mainly of ferrite. The main pole 511 is made of, e.g., Permalloy, Sendust, CoZrNb, amorphous cobalt, or Fe-based nitride film having a higher Bs value (saturation magnetic flux density value) than ferrite.

The medium 2 on or from which recording or reproduction is to be performed by the magnetic head 30 includes a first magnetic film 2a and a second magnetic film 2b. The first magnetic film 2a is a magnetic recording layer having an anisotropy in a direction perpendicular to the surface of the recording medium. The second magnetic film 2b is a soft magnetic underlayer provided between a non-magnetic substrate 2c and the recording layer 2a. The soft under layer 2b is made of, e.g., Permalloy, Sendust, CoZrNb, cobalt amorphous, CoFeTa, Fe-C, or Fe-based nitride film. The magnetic head 30 closely opposes the medium 2 having these recording layer 2a and soft magnetic underlayer 2b. The space between the end face of the main pole 511 and the recording layer 2a is set to several tens nano-meter to several hundreds nano-meter. The thickness of the recording layer 2a is several tens nano-meter.

In the medium 2, an intermediate layer (not shown) can exist between the recording layer 2a and the soft magnetic underlayer 2b. The intermediate layer is provided to improve the orientation of the recording layer 2a. The intermediate layer is made of a non-magnetic material such as titanium, carbon, or germanium and has a thickness of several tens nano-meter to several hundreds nano-meter. Thus, a parameter $\delta$ is preferably set within a range of 10 to several hundreds nano-meter, and the upper limit of the parameter $\delta$ is preferably set at 150 nano-meter.

The correlation among tW/pL, the recording resolution, the saturation magnetic flux density Bs of the main pole 511, and the parameter $\delta$ will be described with reference to FIGS. 5 to 10.

Figure 5:
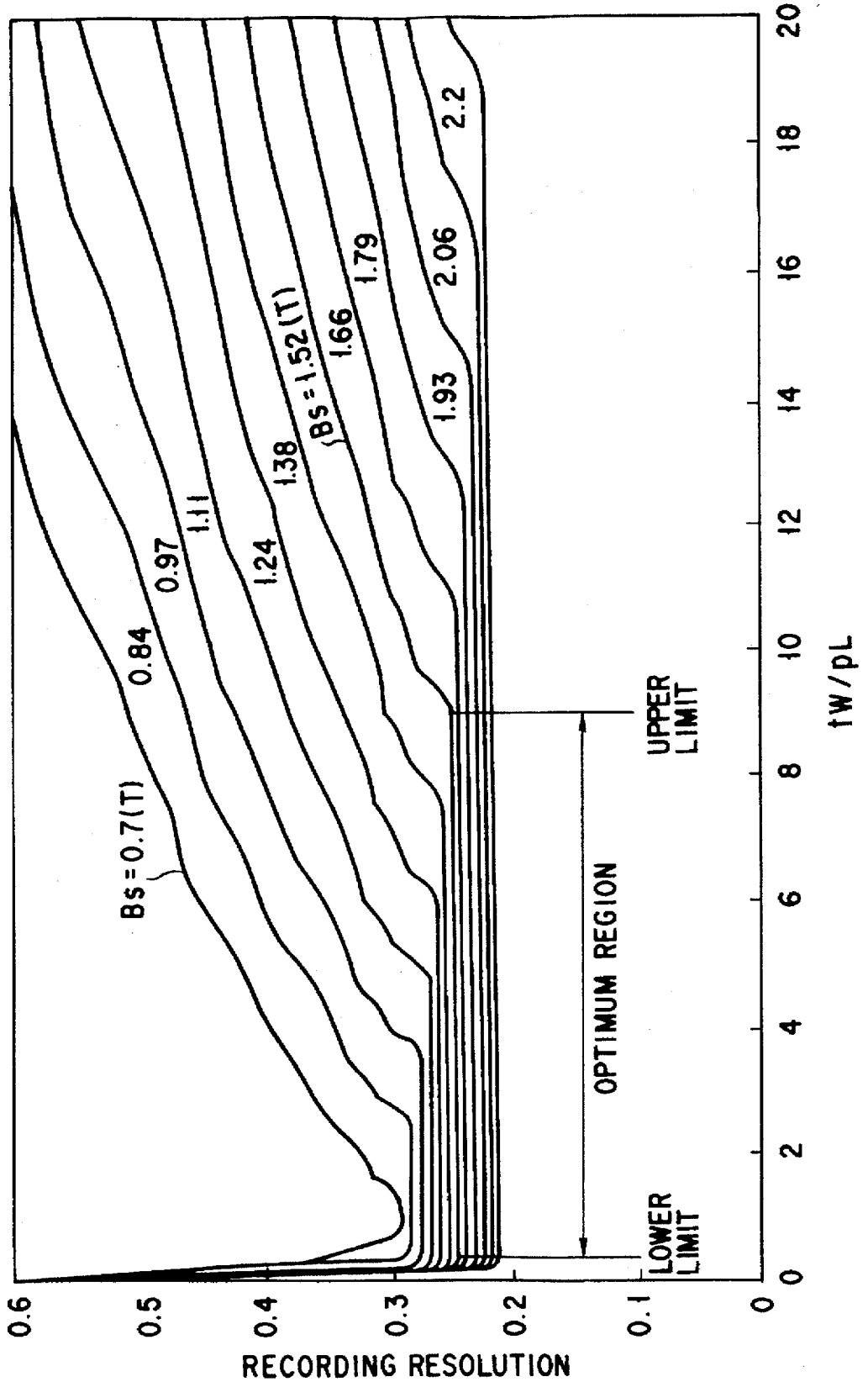
FIG. 5 is a graph showing the relationship between a ratio tW/pL and a recording resolution.

FIG. 5 is a graph showing a result obtained by studying the correlation between tW/pL and a recording resolution by plotting tW/pL along the axis of abscissa and the recording resolution along the axis of ordinate. The "recording resolution" is the value of an amount corresponding to a perpendicular magnetization transition width on the surface of a medium on which recording has been performed. The smaller the value of recording resolution, the more narrower the perpendicular magnetization transition width, so that high-quality recording can be performed. As shown in FIG. 5, when the value of recording resolution is 1, the corresponding perpendicular magnetization transition width is about 0.05 µm.

Recording operations were performed by using magnetic heads respectively having respective saturation magnetic flux densities Bs of 0.7 (T), 0.84 (T), 0.97 (T), 1.11 (T), 1.24 (T), 1.38 (T), 1.52 (T), 1.66 (T), 1.79 (T), 1.93 (T), 2.06 (T), and 2.2 (T), and the dependency of the recording resolution on tW/pL was examined. As a result, it became apparent that a region of tW/pL where the recording resolution strongly depended on tW/pL and a region (or optimum region) of tW/pL where the recording resolution did not depend on tW/pL existed. In the latter region, an optimum region of tW/pL where the recording resolution is stabilized at a low level exists. The optimum region of tW/pL is determined by two inflection points where the recording resolution changes largely. When tW/pL is set in such an optimum region, magnetization in the perpendicular recording layer 2a of the medium is set in a direction sufficiently perpendicular to the surface of the medium, so that information can be recorded completely.

Figure 6:
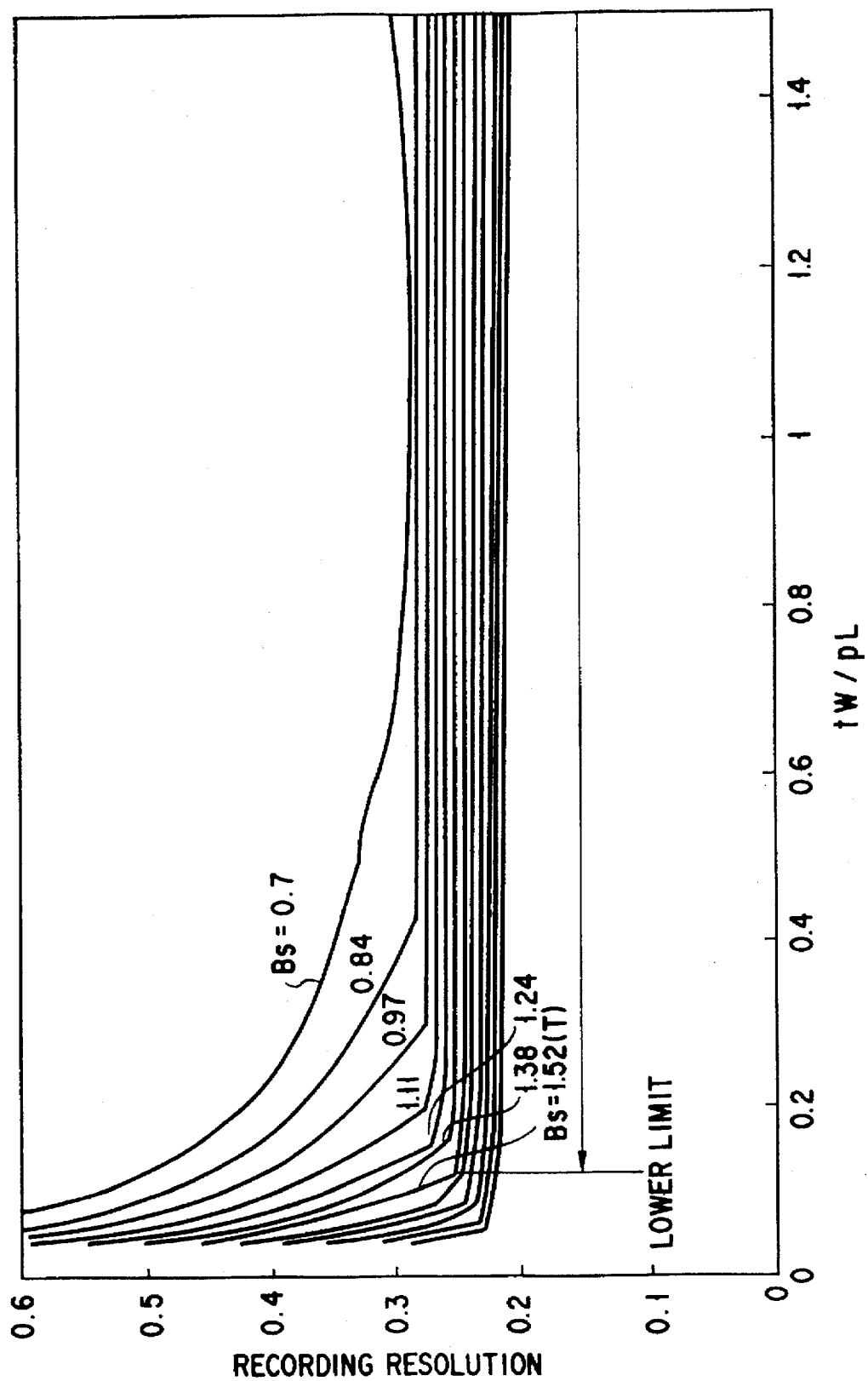
FIG. 6 is a graph showing the relationship between a ratio tW/pL and a recording resolution.

FIG. 6 is an enlarged view of a region where tW/pL is small. FIG. 6 is also a graph showing the correlation between tW/pL and the recording resolution. In a region where tW/pL is very small, the recording resolution is high. When tW/pL exceeds the lower limit of the optimum region, the recording resolution is stabilized at a low level. When tW/pL exceeds the upper limit of the optimum region, the recording resolution is gradually increased.

A specific optimum region of tW/pL exists for each Bs of the head core 55. In particular, the upper limit of the optimum region of tW/pL strongly depends on Bs and largely changes according to Bs. The smaller the value of Bs, the larger the optimum region of the tW/pL is small. In contrast to this, the larger the value of Bs, the larger the optimum region of tW/pL. For example, for a magnetic head having Bs=1.52 (T), the optimum region of tW/pL is within a range of 0.16 to 9.10 (0.16<tW/pL<9.1), as is apparent from FIGS. 5 and 6. The relationship between tW/PL and Bs also depends on a parameter $\delta$.

Figure 7:
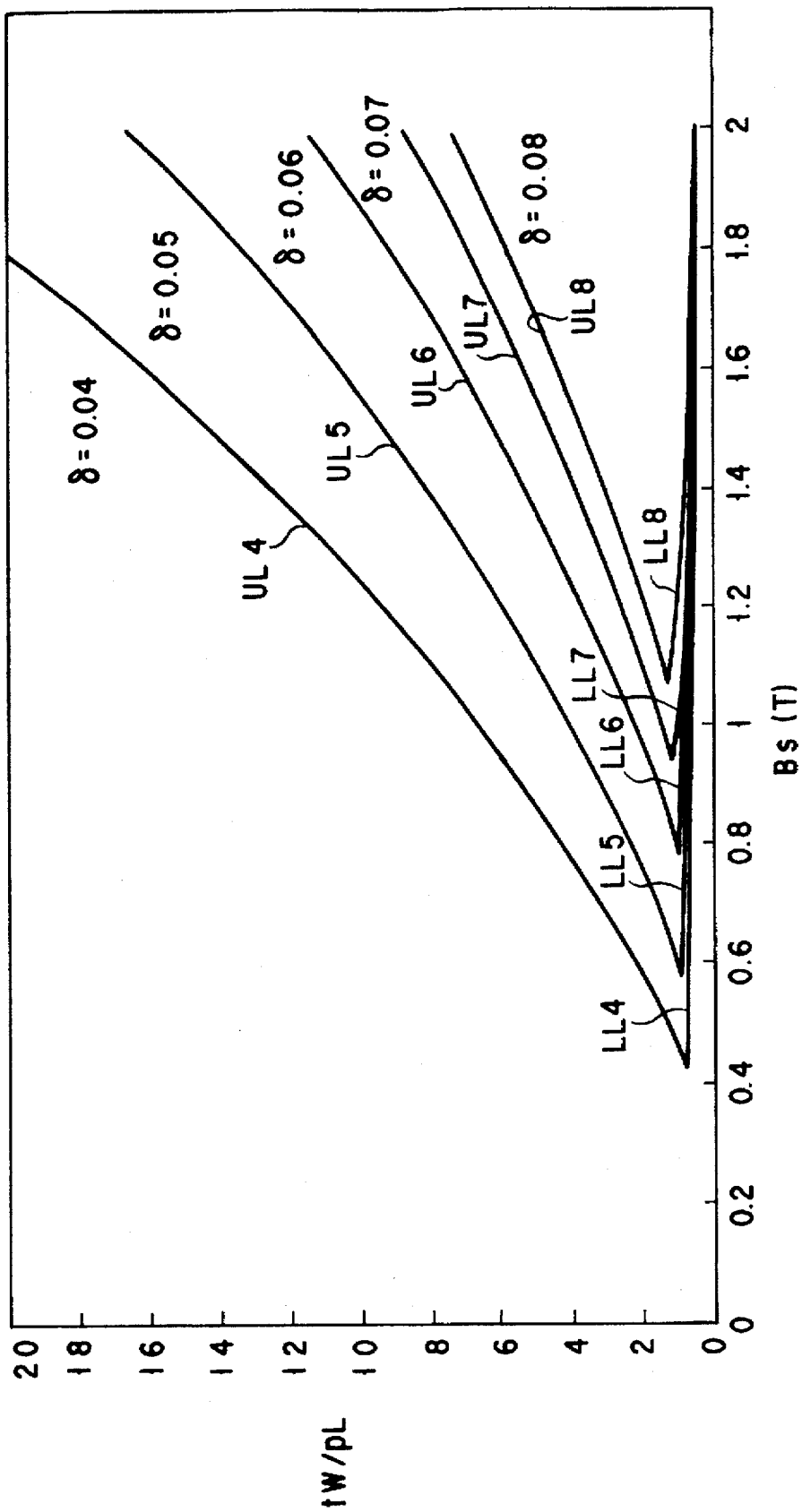
FIG. 7 is a graph showing the relationship between a saturation magnetic flux density Bs and a ratio tW/pL.
Figure 8:
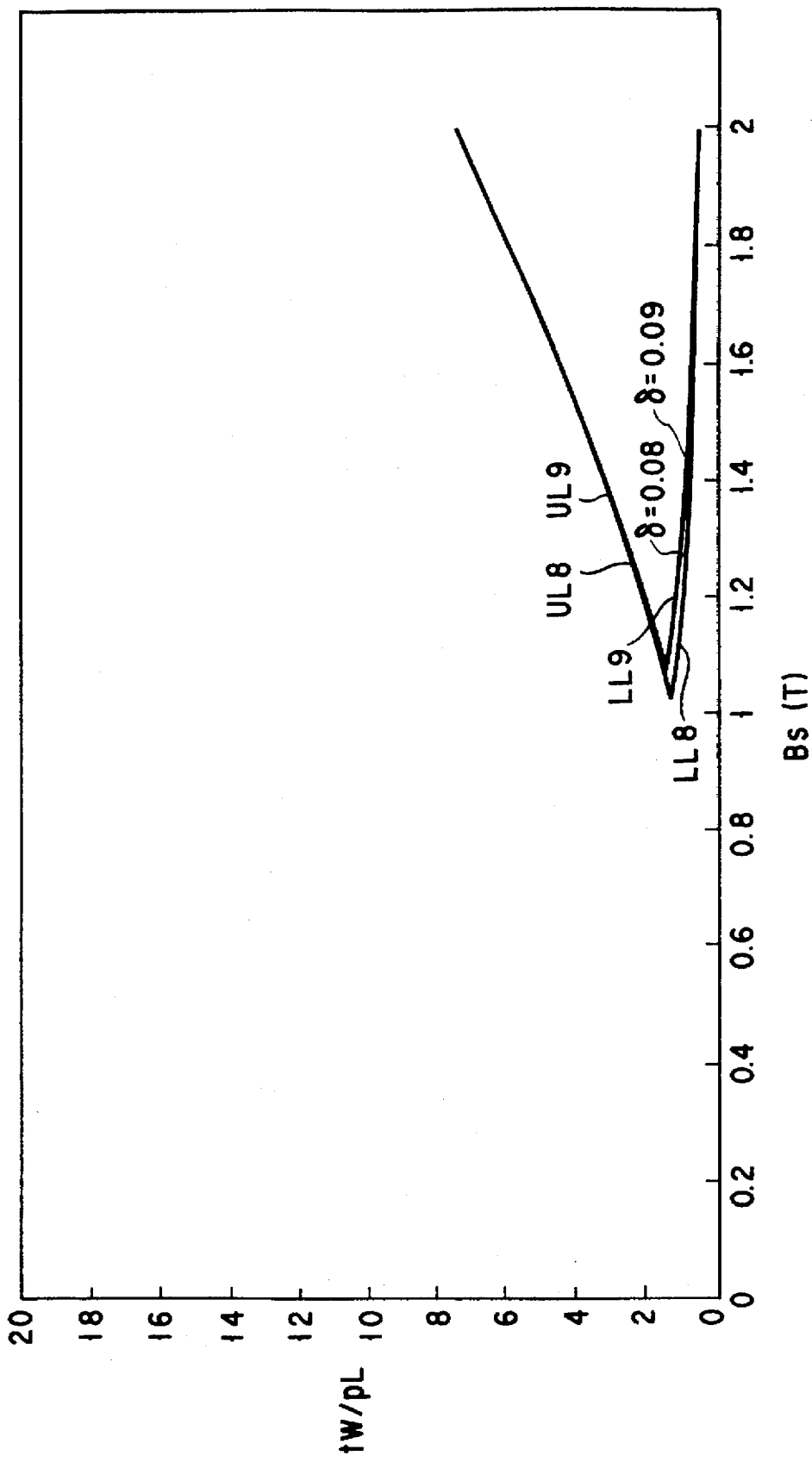
FIG. 8 is a graph showing the relationship between a saturation magnetic flux density Bs and a ratio tW/pL.

FIGS. 7 and 8 are graphs showing results obtained by examining the regions (optimum use regions) of the optimum recording conditions of the respective parameters $\delta$ by plotting the saturation magnetic flux density Bs along the axis of abscissa and tW/pL along the axis of ordinate. The parameter $\delta$ corresponds to the distance (μm) from a distal end portion 511a of the main pole 511 to the soft magnetic under layer 2b and is equal to a length obtained by adding the thickness of the recording layer 2a to the head spacing (head flying height). The optimum use regions for the parameter $\delta$=0.04 μm, 0.05 μm, 0.06 μm, 0.07 μm, 0.08 μm, and 0.09 μm, respectively, were obtained.

For example, when the parameter $\delta$ is 0.04 μm, the region sandwiched by a lower limit line LL4 and an upper limit line UL4 in FIG. 7 corresponds to the optimum use region. Similarly, the regions sandwiched by lower limit lines LL5 to LL9 and upper limit lines UL5 to UL9, respectively, correspond to the optimum use regions for the parameter $\delta$=0.05 μm, 0.06 μm, 0.07 μm, 0.08 μm, and 0.09 μm, respectively. When Bs and tW/pL are set in the optimum use region, a signal can be recorded at a high recording density. From these results, a function that defines the lower limit line of the optimum use region and a function that defines the upper limit line of the optimum use region are determined.

The lower and upper limit lines of the optimum use region will be described with reference to FIGS. 9 and 10.

First, by employing Bs and $\delta$ as parameters, the lower limit line of the optimum use region is expressed by the following equation:

$$tW/pL=(A_1 \times Bs+B_1)^2+C_1$$

Figure 9:
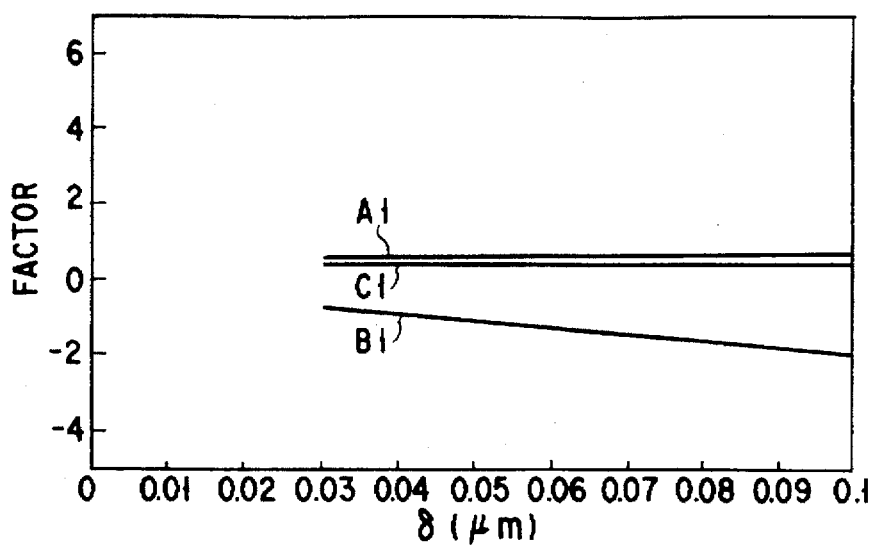
FIG. 9 is a graph used for determination of factors $A_1$, $B_1$, and $C_1$ of lower limit lines.

FIG. 9 is a graph for obtaining the relationship between each of coefficients $A_1$, $B_1$, and $C_1$ of the above equation and the parameter $\delta$. From this graph, the coefficients $A_1$, $B_1$, and $C_1$ are respectively obtained as the functions of the parameter $\delta$ as follows:

$A_1=4.3 \times \delta+0.4$ $B_1=-16.2 \times \delta-0.3$ $C_1=2.2 \times \delta+0.3$ By employing Bs and $\delta$ as parameters, the upper limit line of the optimum use region is expressed by the following equation:

$$tW/pL=(A_2 \times Bs+B_2)^2+C_2$$

Figure 10:
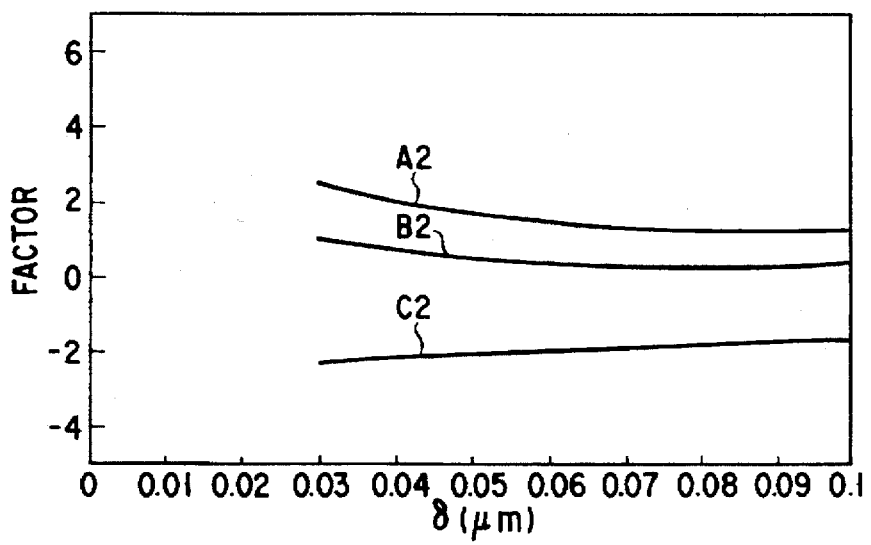
FIG. 10 is a graph used for determination of factors $A_2$, $B_2$, and $C_2$ of upper limit lines.

FIG. 10 is a graph for obtaining the relationship between each of the coefficients $A_2$, $B_2$, and $C_2$ of the above equation and the parameter $\delta$. From this graph, the coefficients $A_2$, $B_2$, and $C_2$ are respectively obtained as the functions of the parameter $\delta$ as follows:

$A_2=378 \times \delta-66 \times \delta+4.2$ $B_2=264 \times \delta^2-43 \times \delta+2.1$ $C_2=9 \times \delta-2.5$ Thus, the optimum use region is given by the following inequality:

$$(A_2 \times Bs+B_1)^2+C_1 \leq tW/pL \leq (A_2 \times Bs+B_2)^2+C_2$$

for $A_1=4.3 \times \delta+0.4$ $B_1=-16.2 \times \delta-0.3$ $C_1=2.2 \times \delta+0.3$ $A_2=378 \times \delta^2-66 \times \delta+4.2$ $B_2=264 \times \delta^2-43 \times 6+2.1$ $C_2=9 \times \delta-2.5$ The optimum use region can also be given by the following two inequalities in accordance with the value of Bs.

In the range of $0.7<Bs \leq 2$, $0.515 \times Bs^2-1.834 \times Bs+2.02 < tW/pL < 3.312 \times Bs^2+1.909 \times Bs-1.42$ In the range of $Bs>2$, $0.4<tW/pL<3.312 \times Bs^2+1.909 \times Bs-1.42$ In the range of $Bs>2$, the lower limit of tW/pL cannot be set to 0.4 or less.

In the magnetic head employing the perpendicular magnetic recording scheme, the rewrite ability is important. The rewrite ability of a magnetic head evaluated by using "overwrite". Overwrite represents the amount of old information expressed in decibel (dB) which remains without being erased when new information is written on the old information in the overlapping manner. A practical magnetic head must have an overwrite level exceeding −30 dB.

This rewrite ability is improved by reinforcing the magnetic interaction between the first and second magnetic layers 2a and 2b of the medium and the magnetic head. This magnetic interaction depends on the shape of the end face of the main pole, i.e., on tW/pL.

Figure 11:
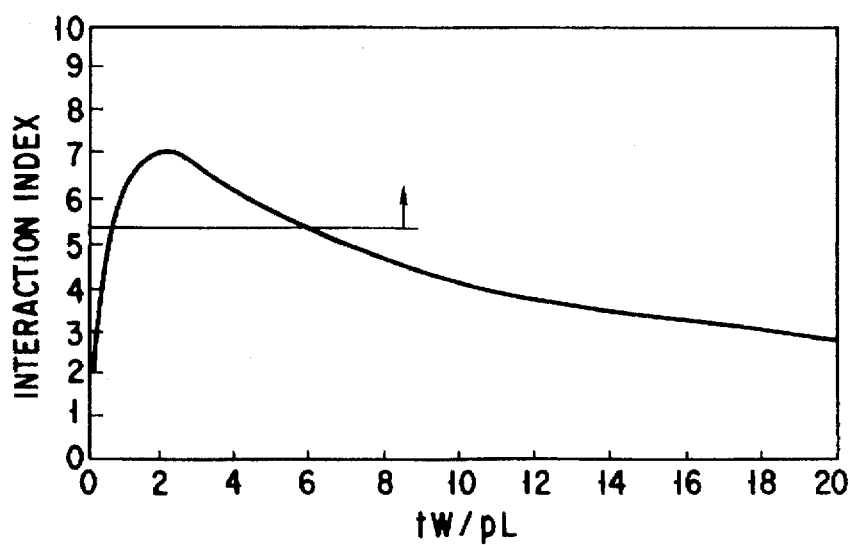
FIG. 11 is a graph showing the relationship between a ratio tW/pL and an interaction index.

FIG. 11 is a graph showing a result obtained by examining the relationship between tW/pL and the interaction index by plotting tW/pL along the axis of abscissa and the interaction index along the axis of ordinate. As is apparent from FIG. 11, a good magnetic interaction can be obtained when tW/pL is 0.4 to 6.0.

Figure 12:
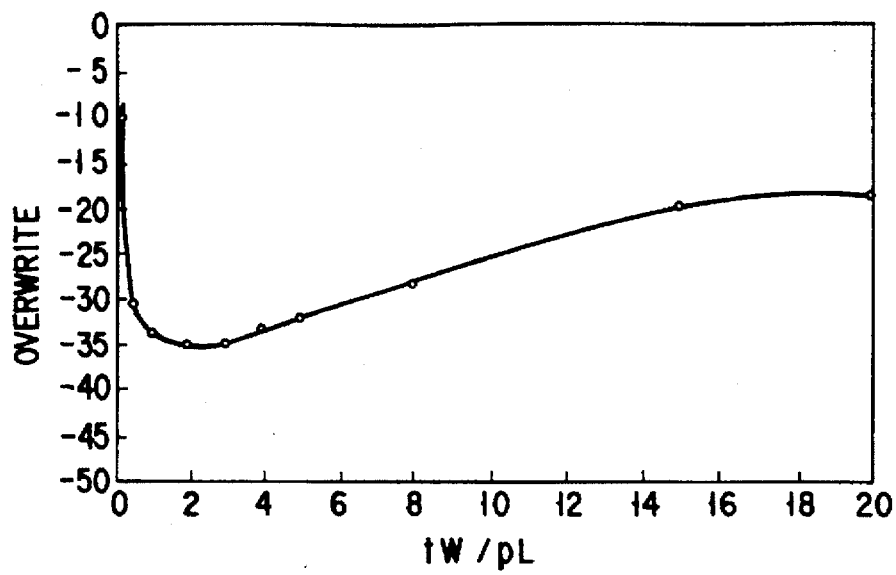
FIG. 12 is a graph showing the relationship between a ratio tW/pL and overwrite.

FIG. 12 is a graph showing a result obtained by examining the relationship between tW/pL and the overwrite (dB) by plotting tW/pL along the axis of abscissa and the overwrite level along the axis of ordinate. As is apparent from FIG. 12, the overwrite level exceeds −30 dB when tW/pL is 0.4 to 6.0. When tW/pL is set in the optimum use region in this manner, good overwrite characteristics can also be obtained.

Figure 13:
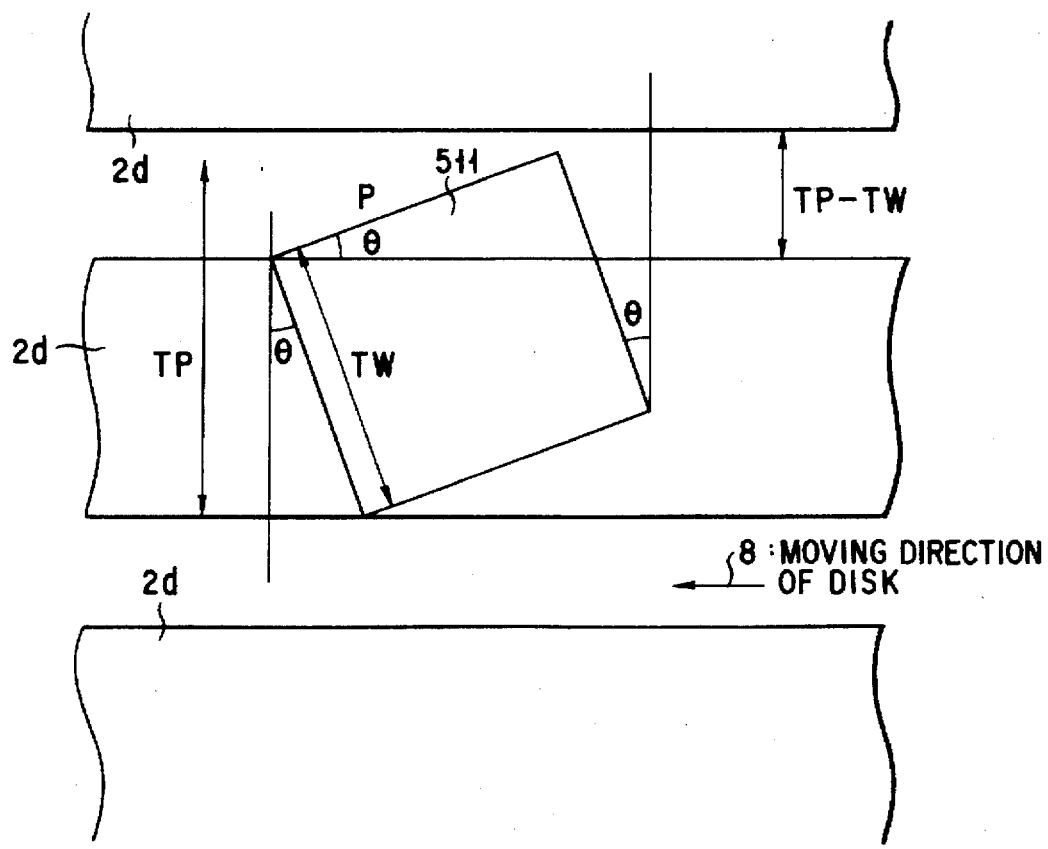
FIG. 13 is a diagram showing the relationship between the main pole of a magnetic head and a track pitch according to the second embodiment of the present invention.

FIG. 13 is a diagram schematically showing the relationship between the shape of the main pole and the position of the main pole of the head on a track. Of a large number of tracks formed on a magnetic recording medium, three tracks 2d are shown as the representative. The medium moves in a direction indicated by an arrow 8 in FIG. 13. The main pole 511 is on the central recording track 2d. The left side of the main pole 511 of the head is a trailing edge which forms magnetization transition.

The magnetic head having the main pole shown in FIG. 13 will be described.

A track pitch tP=1.5 μm, a recording track width tW=1.0 μm, a width pL of the main pole in the travel direction=5.0 μm, and a skew angle $\theta$=5° were set.

At this time, the main pole 511 records a signal as it is inclined by 5° from the direction of the length of the track 2d due to the skew angle θ. Since the width pL of the main pole 511 in the travel direction is set at 5.0 μm, an equality:

$$pL < (tP - tW\cos\theta)/\sin\theta$$

is satisfied. When this condition is satisfied, the main pole 511 does not erase a recording signal of an adjacent track 2d, so that a high-quality signal which does not cause interference between tracks can be obtained even at a high track density of 17,000 TPI.

Figure 14:
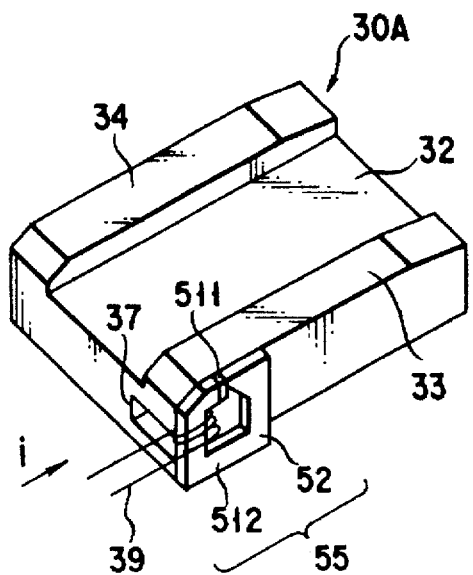
FIG. 14 is a perspective view showing a magnetic head according to the third embodiment of the present invention.
Figure 15:
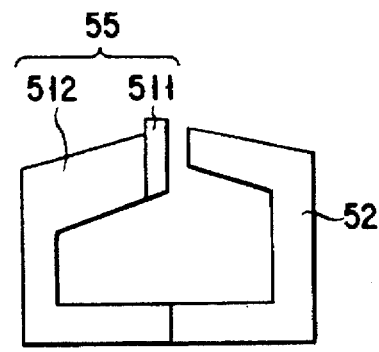
FIG. 15 is an enlarged front view showing the main pole portion of the magnetic head according to the third embodiment.

A magnetic head according to still another embodiment of the present invention will be described with reference to FIGS. 14 and 15.

A magnetic head 30A of this embodiment is basically identical to that of the above embodiment except for the following respect. More specifically, in this embodiment, a head core 55 has a main pole 511 and a return path portion 52. A coil 39 is wound on the main pole 511. The return path portion 52 is attached to the pole 511 so that the magnetic flux is concentrated on the distal end portion of the main pole 511. The return path portion 52 is not a necessary member but is an arbitrary member. Even if the return path portion 52 is not provided, recording and reproduction can be performed only by the main pole 511. As shown in FIG. 15, the head core 55 has the main pole 511, a ferrite portion 512, and the return path portion 52. The main pole 511 is made of, e.g., Permalloy, Sendust, CoZrNb, CoZr-based amorphous, amorphous cobalt, CoFeTa, Fe-C or a compound of Fe-based nitride film.

In order to concentrate the magnetic flux on the distal end portion of the main pole 511, the distal end portion of the main pole 511 is set to project higher than other portions of the head core 55, so that the end face of the main pole 511 is set as close as possible to the medium 2. In other words, the ferrite portion 512 is located farther from the medium 2 than the distal end portion of the main pole 511 is. Then, the magnetic flux is preferably concentrated on the distal end portion of the main pole 511.

The widths of rails 33 and 34 are usually equal. However, a width of the rail on the outer side of the slider may be made to be smaller than a width of the rail on the inner side of the slider, so that the flying height of the head on the outer side becomes smaller than that on the inner side.

The magnetic head 30A having the above arrangement is not different from the conventional magnetic head in that its head core 55 is magnetized by supplying power to the coil 39 and that information is recorded on or reproduced from a perpendicular magnetic recording medium. However, the magnetic head 30A is especially effective when recording/ reproduction is to be performed on/from a two-layered perpendicular magnetic recording medium having a soft magnetic under layer. For example, when an MR head utilizing a magnetoresistive effect is employed in the reproducing head to separate the recording and reproducing functions, the effect of the present invention is enhanced. The effect of the present invention is further enhanced in a magnetic head in which the recording and reproducing functions are separated and the recording track width is 2 μm or less.

In this embodiment, a perpendicular recording head whose slider 32 does not have a narrow slit can be realized by providing the head core 55 having the main pole outside a slider 32.

Since the head core 55 having the main pole can be formed thin after it is adhered to the slider 32, a head core which is greatly thinner than a conventional head core can be fabricated at a high yield, thereby providing a magnetic head which has a small eddy current loss and which can cope with an RF signal. This is the characteristic feature which is important especially in a perpendicular magnetization scheme magnetic head as compared to a longitudinal ring head.

Figure 16:
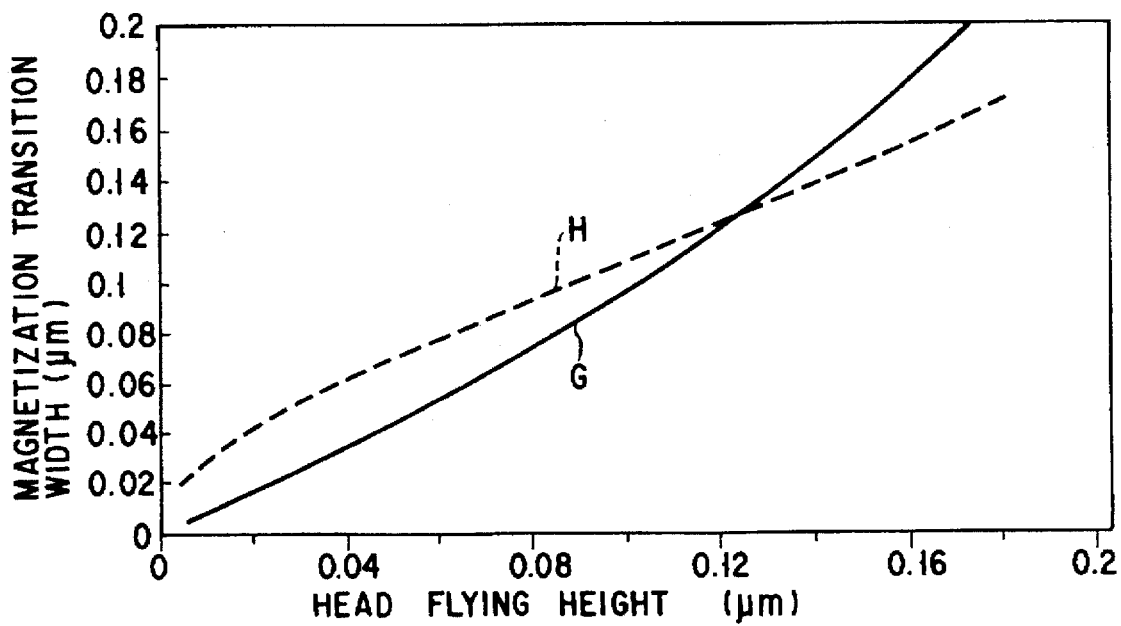
FIG. 16 is a graph showing the relationship between a head flying height and a magnetization transition width.

A case wherein longitudinal recording is performed on a thin-film metal medium by using a ring head (comparative example) and a case wherein perpendicular recording is performed on a perpendicular double-layered film medium 2 by using a perpendicular magnetization scheme head (this embodiment) will be compared with reference to FIG. 16.

FIG. 16 is a graph showing a result obtained by examining the spacing dependency of the magnetization transition width of each recording scheme by plotting the head floating amount (μm) along the axis of abscissa and the magnetization transition width (μm) along the axis of ordinate. In FIG. 16, a curve G indicates the result of the perpendicular recording scheme, and a curve H indicates the result of the longitudinal recording scheme. The conditions for perpendicular recording are: Hc=1,000 Oe, Ms=500 emu/cc, t=0.1 μm, Tm=0.4 μm, and Hg=7,000 Oe (Bs=1.1 T). The conditions for longitudinal recording are: Hc=1,800 Oe, Mr=580 emu/cc, S=0.9 μm, g=0.3 μm, Hg=4,400 Oe (Bs=0.9 T).

As is apparent from FIG. 16, a decrease in magnetization transition width accompanying a decrease in spacing is larger in perpendicular recording than in longitudinal recording, and the recording resolution of perpendicular recording is higher when the spacing is 0.1 μm or less. Accordingly, in a low spacing region of 0.1 μm or less, the effect accompanying low floating of the head is higher in the perpendicular recording scheme than in the longitudinal recording scheme.

In the magnetic head according to this embodiment in which the head core is arranged outside the slider, the main pole 51 can set to project toward the surface of the medium to be higher than the height of the slider rail 33 as compared to a conventional head in which the head core is buried in the slit of a rail. Thus, low floating can be achieved. As a result, the spacing between the head and the medium can be decreased. This effect is higher in the perpendicular recording head having the main pole of this embodiment than in the conventional ring head.

With the magnetic head of the present invention, perpendicular recording having a high recording ability can be obtained at maximum, thereby remarkably increasing the recording ability.

When this magnetic head is used in a magnetic disk drive, even if the track density is very high, the main pole will not bulge into the signal recording region of an adjacent track. Thus, the magnetic head will not erroneously erase information on the adjacent track or overwrite it on the adjacent track.

When the head core is arranged outside the slider, the head can be moved in slight contact with the medium. Thus, the recording or reproducing efficiency can be increased while maintaining a high wear resistance and durability of the head and the medium which are of the same level as those of a floating head.

When this structure is employed in a magnetic head, a slit need not be formed in the slider. Since the head core is formed thin after it is mounted on the slider, the head core itself at the start of fabrication can be thick to a certain degree, and can be formed thin. Therefore, the eddy current is decreased, thereby improving the RF characteristics. These are characteristics that are effective especially in a perpendicular recording head.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A magnetic head for recording or reproducing information on or from a magnetic recording medium including a magnetic recording layer for information recording which has a magnetic anisotropy in a direction perpendicular to a surface of said recording medium, a soft magnetic underlayer provided under said magnetic recording layer and having soft magnetic properties, and a non-magnetic substrate, wherein a ratio tW/pL of a track width tW to a width pL of an end face, in a traveling direction, of a main pole which performs recording or reproduction on or from said magnetic recording layer, and a saturation magnetic flux density Bs (T: tesla) of a magnetic material constituting said main pole satisfy:

$$(A_1 \times Bs + B_1)^2 + C_1 \leq tW/pL \leq (A_2 \times Bs + B_2)^2 + C_2$$

for $A_1 = 4.3 \times \delta + 0.4$ $B_1 = -16.2 \times \delta - 0.3$ $C_1 = 2.2 \times \delta + 0.3$ $A_2 = 378 \times \delta^2 - 66 \times \delta + 4.2$ $B_2 = 264 \times \delta^2 - 43 \times \delta + 2.1$ $C_2 = 9 \times \delta - 2.5$ where $\delta$ (μm) is a distance from said end face of said main pole to said soft magnetic underlayer.

2. A head according to claim 1, wherein said ratio tW/pL is set such that the saturation magnetic flux density Bs of said main pole has a minimum value.

3. A head according to claim 1, wherein a clearance between said end face of said main pole and said magnetic recording layer is not more than 0.1 μm.

4. A head according to claim 3, wherein said clearance is 0.09 μm or less.

5. A head according to claim 1, wherein the saturation magnetic flux density Bs of said main pole is 0.7 to 2.2 T.

6. A head according to claim 1, wherein an inequality 0.16<tW/pL<9.1 is satisfied when the saturation magnetic flux density Bs of said main pole is 1.52 T.

7. A head according to claim 1, wherein the track width tW of said main pole is not more than 2 μm.

8. A magnetic head for recording or reproducing information on or from a magnetic recording medium including a magnetic recording layer for information recording which has a magnetic anisotropy in a direction perpendicular to a surface of said recording medium, a soft magnetic underlayer provided under said magnetic recording layer and having soft magnetic properties, and a non-magnetic substrate, comprising a head core having a main pole for perpendicular magnetic recording, and a non-magnetic slider integrally formed with said head core and having a rail for generating a floating force on a surface thereof opposing a magnetic disk, wherein a ratio tW/pL of a track width tW to a width pL of an end face, in a traveling direction, of a main pole which performs recording or reproduction on or from said magnetic recording layer, and a saturation magnetic flux density Bs (T: tesla) of a magnetic material constituting said main pole satisfy:

$$(A_1 \times Bs + B_1)^2 + C_1 \leq tW/pL \leq (A_2 \times Bs + B_2)^2 + C_2$$

for $A_1 = 4.3 \times \delta + 0.4$ $B_1 = -16.2 \times \delta - 0.3$ $C_1 = 2.2 \times \delta + 0.3$ $A_2 = 378 \times \delta^2 - 66 \times \delta + 4.2$ $B_2 = 264 \times \delta^2 - 43 \times \delta + 2.1$ $C_2 = 9 \times \delta - 2.5$ where $\delta$ (μm) is a distance from said end face of said main pole to said soft magnetic underlayer, and said main pole is attached to a surface of said slider which is perpendicular to a slide surface of said slider rail.

9. A head according to claim 8, further comprising, said head core has a return path portion.

10. A head according to claim 8, further comprising, said head core has a ferrite portion whose saturation magnetic flux density Bs is lower than that of said main pole.

11. A head according to claim 10, wherein said main pole has a distal end portion which projects from said head core toward said medium, and said ferrite portion is located farther from said medium than said distal end portion of said main pole is.

12. A head according to claim 8, wherein said end face of said main pole has the same level as level with said slide surface of said slider rail or is located closer to said medium than said slide surface is.

13. A head according to claim 8, wherein said slider is made of a titanate-based ceramic.

14. A head according to claim 1, wherein said head core is made of at least one of the group consisting of ferrite, 35–80% Ni-Fe alloy, 9% Si-5% Al-Fe alloy, CoZrNb, amorphous cobalt, CoFeTa, Fe-C and a compound of Fe-based nitride.

15. A head according to claim 8, wherein said slider rail has a width substantially uniform throughout an entire length thereof.

16. A head according to claim 8, wherein a rail on an outer side of said slider has a smaller width than that of a rail on an inner side of said slider.

* * * * *